United States Patent [19]

Myer

[11] Patent Number: 5,041,472

[45] Date of Patent: Aug. 20, 1991

[54] SYNTACTIC FOAM ENERGY ABSORBER

[75] Inventor: Jon H. Myer, Woodland Hills, Calif.

[73] Assignee: Hughes Aircraft Company, Los Angeles, Calif.

[21] Appl. No.: 630,141

[22] Filed: Dec. 19, 1990

[51] Int. Cl.$^5$ ............................................. C08J 9/32
[52] U.S. Cl. .................................... 523/219; 521/54; 521/55; 523/218
[58] Field of Search ................. 523/218, 219; 521/54, 521/55

[56] References Cited

U.S. PATENT DOCUMENTS 4,839,394  6/1989  Champion ........................... 523/219

Primary Examiner—Morton Foelak
Attorney, Agent, or Firm—Leonard A. Alkov; Wanda Denson-Low

[57] ABSTRACT

An expendable syntactic foam energy absorber having application to vehicles comprising first hollow ceramic microspheres and substantially smaller hollow ceramic microspheres distributed to fill the interstices between the first microspheres. An elastomeric binder is blended into the microsphere intermix to fill in any residual interstices between the microspheres while binding the microspheres in substantially abutting contact and leaving substantially no room for the binder to move.

15 Claims, 1 Drawing Sheet

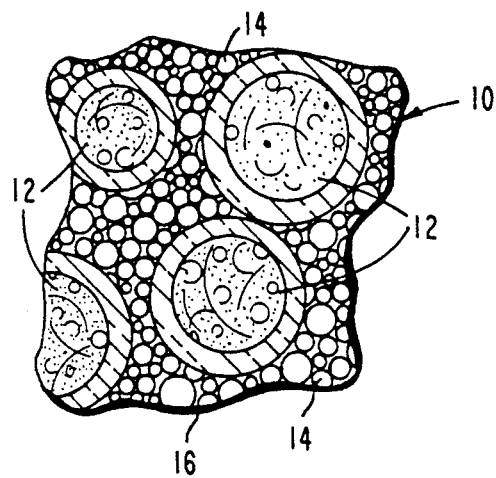
Fig. 1.
Fig. 2.
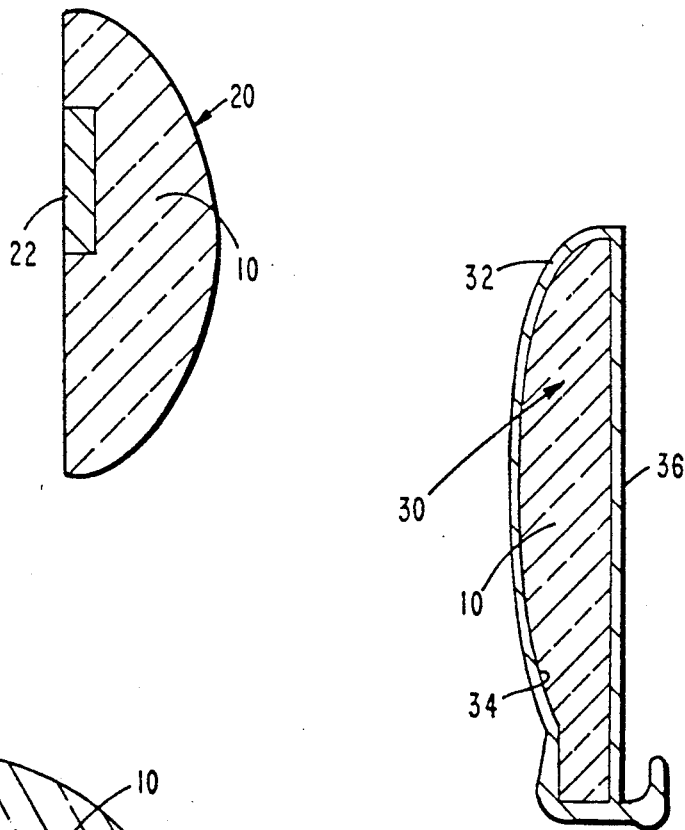
Fig. 3.
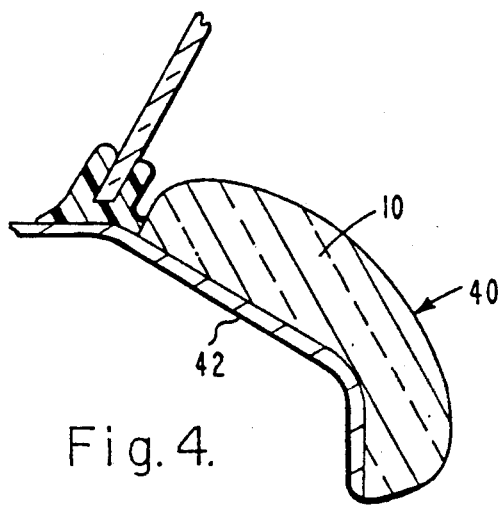
Fig. 4.

SYNTACTIC FOAM ENERGY ABSORBER

BACKGROUND OF THE INVENTION

1. Field of the Invention

This invention relates generally to energy absorbers and more particularly to a syntactic foam energy absorber of the type that can be used to protect underlying structures including motor vehicles.

2. Description of the Related Art

Presently vehicles such as automobiles are required to have energy deflecting members which protect the passengers and the vehicle itself from the effects of collisions. Among the present conventional forms of protection are rigid metal and plastic bumpers. Moreover, side doors have included rigid metal members which are intended to reduce intrusion of another vehicle into the passenger compartment during a crash, but which do not effectively absorb a sufficient amount of energy. In addition, the instrument panels have been padded with foam plastics which cushion the force exerted on vehicle occupants during secondary impacts with the panel. All of these approaches have their advantages and some shortcomings in certain circumstances.

To date, conventional syntactic foam has been proposed for structural applications. Such foams have included hollow plastic or ceramic microspheres held together with a binder. Some examples of structural foams are given in the Encyclopedia Of Composite Materials and Components, copyright 1983, by John Wiley & Sons, page 548. It has been suggested generally that syntactic foams might have application in the automotive industry in WARDS Auto World, March 1989, pages 87 and 88. However, the previously known syntactic foams are believed to be too brittle, are susceptible to fracture over a narrow range of stress, and are not able to absorb energy over a sufficiently wide range to be effective for applications including the ones indicated herein.

SUMMARY OF THE INVENTION

The present invention is embodied in a syntactic foam that includes a mixture of hollow ceramic microspheres of a first size and a substantially smaller second size. The smaller size microspheres generally fill in the interstices between the larger spheres. This mixture of spheres is held together with an elastomeric binder that fills in the remaining interstices between the microspheres and holds the microspheres in closely packed relationship with each other.

When an object with energy above a certain level impacts on the resilient syntactic foam structure, the elastomeric binder distributes the forces that are generated while the hollow ceramic microspheres crush and absorb localized stresses, thereby greatly reducing localized forces and the occurrence of damage to an underlying structure. In this manner, the energy absorbing structure is sacrificed while low forces are transmitted to the underlying structure.

Advantages of this invention are that it is a lightweight, low-density, self-supporting structure that is capable of absorbing a significant amount of energy. Moreover, the material is readily moldable into complex structures and has a high degree of dimensional integrity when molded. Consequently, the accuracy and precision of the molded members is readily maintained. In addition, the material can be molded and cured at about ambient room temperature or at elevated temperatures. Furthermore, the adhesive strength of the resilient binder material is quite high, thereby making it possible to mold the energy absorbing elements in situ by filling in voids in the underlying structure such as might be the case for side door safety panels and in other possible applications.

Other advantages include the inert nature, the ready availability, and the comparative low cost of the constituent materials used. Moreover, the materials of the syntactic foam do not support combustion and are non-toxic.

BRIEF DESCRIPTION OF THE DRAWINGS

FIG. 1 is an enlarged view in cross-section of a portion of the syntactic foam structure showing a possible relationship between large diameter and small diameter ceramic microspheres and an elastomeric binder;

FIG. 2 is a side elevation view in cross-section of an automobile bumper;

FIG. 3 is a side elevation view in cross-section of a portion of a side door energy absorbing member; and FIG. 4 is a side elevation view in cross section of a portion of a dashboard protector for a vehicle.

DESCRIPTION OF THE PREFERRED EMBODIMENTS

As illustrated in FIG. 1, features of the invention are embodied in a resilient syntactic foam structure 10 that includes first "Foamy" ceramic microspheres 12 of substantially larger average diameters than the average diameters of the smaller second hollow ceramic microspheres 14. Hereinafter, these microspheres 12 and 14 will also be referred to as spheres. The larger spheres 12 must not be so coarse that they create large interstices when they abut and are adjacent to each other while at the same time, they must be of sufficient size to absorb energy. For examples described herein, the average or nominal diameters of the smaller spheres 14 are typically less than about 1/5 of the average or nominal diameters of the larger spheres 12 and must be small enough to substantially fill in the interstices between the larger spheres while leaving very little residual interstitial space.

Such hollow ceramic microspheres are well-known and are commercially available from a number of sources. In fabricating embodiments of the invention, the hollow ceramic microspheres 12 and 14 are comprised of an inert ceramic containing either one or several minute, independent, closed air cells surrounded by a hard, tough, outer ceramic shell. Hollow lightweight ceramic microspheres of this type are described generally in Plastic Compounding; March/April 1981. It should also be noted that while specific sizes of microspheres are listed below, the microspheres in any given commercial batch used are not all within this dimensional range, but that the great majority of them are.

Examples of microspheres used for the larger diameter microspheres 12 in the examples listed below included in size ML 1430 and ML 714 Ceramic Spheres manufactured by Minnesota Mining & Manufacturing and sold under the tradename Macrolite. The size ML 1430 microspheres have typical diameters of between 0.6 and 1.4 millimeters with a nominal bulk density of 0.45 grams/cubic centimeter. The size ML 714 microspheres have typical diameters of between about 1.4 and 2.8 millimeters with a nominal bulk density of about 0.40 grams/cubic centimeter.

For the smaller diameter microspheres 14, the size B 23 Glass Bubbles, manufactured by Minnesota Mining & Manufacturing and sold under the tradename Scotchlite, were used. These microspheres 14 have typical diameters of between about 0.020 and 0.13 millimeters and a nominal bulk density of about 0.145. It should of course be understood that there are other equivalent hollow microspheres available from other sources that can be used in place of the specific examples given.

These hollow ceramic microspheres 12 and 14 are intermixed so that the larger diameter spheres 12 are fairly uniformly distributed throughout the structure 10 and the smaller spheres 14 fill in the interstices between the larger spheres 12.

An elastomeric binder 16 is intermixed with the spheres 12 and 14 and effectively forms a bonding matrix that fills in the residual interstices between the spheres 12 and 14. This binder 16 is highly adhesive to the surface of the spheres 12 and 14. A minimal to very low volume of binder is preferred to fill in any residual intersticial space while leaving the spheres packed in close enough contact to substantially abut each other in that a significant percentage of them actually touch one another or at least are close enough together to leave virtually no room or very little room for the elastomeric binder 16 to flex and move. It is preferred that all voids and bubbles be removed to the extent practical. As a result of such close packing of the spheres 12 and 14, the syntactic foam member 10 is relatively rigid even though an elastomeric binder 16 is used. Moreover, the relatively low percentage volume of binder used gives the structure dimensional stability during and after molding.

While there are a number of possible materials that can be used for the elastomeric binder 16, and elastomeric urethane has been used effectively. Materials of this type are described generally in McGraw-Hill Encyclopedia Of Science & Technology, 6th Edition, Volume 14, pages 167 and 168, copyright 1987. A specific binder that was used for the Examples described below is a two-part clear elastomeric urethane, Flexibond 431, and catalyst, Flexibond BA 431, manufactured by Bacon Industries. This material has a cured density of 1.1 grams/cubic centimeter and can be cured at room temperature (around 70°F.) or, if the curing time is to be shortened, at elevated temperature.

It should of course be understood that other available elastomeric binders having high adhesion properties could be used in place of the specific polyurethane binder described above.

During curing, the syntactic foam structure 10 is subjected to pressure to remove voids and bubbles. A pressure of about 5 p.s.i. is sufficient for this purpose.

When impact energy is applied to the cured foam structure 10, the hollow ceramic microspheres 12 and 14 are crushed by the resultant force and effectively absorb it. Localized stresses are dissipated by the collapsing microspheres and thus reduce the occurrence of premature failures of the underlying structures under the influence of these stresses.

Referring now to the process for making the syntactic foam structure 10, a number of examples are given in which Example 1 is the preferred embodiment.

EXAMPLE I

Intermix about 58.1% by weight of larger diameter hollow ceramic spheres 12 having typical diameters of between about 0.6 millimeters and about 1.4 millimeters with about 8.7% by weight of smaller diameter hollow ceramic spheres 14 having typical diameters of between about 0.02 millimeters and about 0.13 millimeters;

in a separate container, intermix about 21.0% by weight of elastomeric urethane with about 12.2% by weight of a catalyst to form an elastomeric binder mix 16;

intermix the sphere mix with the binder mix;

transfer the binder and sphere intermix to overfill a mold coated with a boron nitride mold release; and apply about 5 p.s.i. of pressure to the intermix in the mold and cure at ambient room temperature for about 24 hours.

EXAMPLE II

Intermix about 54.1% by weight of larger diameter hollow ceramic spheres 12 having typical diameters of between about 1.4 millimeters and about 2.8 millimeters with about 10.1% by weight of smaller diameter hollow ceramic spheres 14 having typical diameters of between about 0.02 millimeters and about 0.13 millimeters;

in a separate container, intermix about 22.6% by weight of elastomeric urethane with about 13.2% by weight of a catalyst to form an elastomeric binder mix 16;

intermix the sphere mix with the binder mix;

transfer the binder and sphere intermix to overfill a mold coated with a boron nitride mold release; and apply about 5 p.s.i. of pressure to the intermix in the mold and cure at ambient room temperature for about 24 hours.

Some examples of application for a syntactic foam energy absorber for protecting underlying structures in the automotive field are illustrated in FIGS. 2 through 4.

Specifically in FIG. 2, a bumper 20 is constructed to the syntactic foam 10. When energy is applied to the bumper 20 as a result of a collision with another object (not shown), the hollow ceramic microspheres in the syntactic foam member 10 will be crushed by the resulting force and will effectively absorb the energy. Specifically, the elastomeric binder couples the impacting force to the glass spheres which are crushed and dissipate the energy prior to the occurrence of more extensive damage to the underlying structure of an associated vehicle.

As a result of the adhesive properties of the elastomeric binder, the bumper 20 can be bonded during fabrication onto a metal support 22 or other backing member during the molding process. Moreover, the moldability of the syntactic foam allows the bumper to be contoured to the vehicle. Also, the inert nature of the material of the syntactic foam 10 and its resistance to moisture reduces the amount of corrosion protection needed by the underlying metal.

As illustrated in FIG. 3, an energy absorbing panel 30 for a vehicle door 32, or other body members, can be constructed of the syntactic foam 10. Again, because of the adhesive properties of the binder used, it is possible to mold the door safety panel 30 using the interior surface of the metal skin 34 of the door as part of the mold as the unpolymerized pulpy viscid mixture of spheres and elastomeric binder is transferred into the cavity formed by the structure of the door. At the same time, cavities for mechanisms within the door such as, for example, windows and door latch mechanisms (not shown) can be formed in the mixture. As a result of the dimensional stability of the cured polymerized syntactic foam, the safety panel is intimately contoured to the door skin 34. Moreover, the door skin 34 lends added structural support to the panel 32. If desired, another skin 36, disposed within the cavity of the door 32, can be bonded to the other side of the syntactic foam 10 to form a sandwich structure. This approach will effectively absorb energy in a side collision before intrusion into the passenger compartment occurs, thereby reducing the probability of damage and injury.

Referring now to FIG. 4, an energy absorber 40 for a dashboard 42 can be fabricated of syntactic foam 10. Again, it can be molded directly to the dashboard 42, if desired. In addition, the advantages and properties of syntactic foam 10 identified above serve to make this material effective for such applications.

While salient features have been described with respect to particular embodiments, other applications, variations and modifications can be made without departing from the scope of the invention. Accordingly, that scope is intended to be limited only by the scope of the appended claims.

What is claimed is:

1. A syntactic foam energy absorbing member comprising:
    first hollow ceramic microspheres;
    second hollow ceramic microspheres having typical diameters substantially less than the typical diameters of said first hollow ceramic microspheres, said second microspheres being intermixed with said first microspheres and to fill in interstices between said first microspheres; and
    an elastomeric adhesive binder intermixed with said first and said second micropsheres to fill in residual interstices between said microspheres and to bind said microspheres in closely packed relationship with each other.

2. The energy absorbing member of claim 1 in which said elastomeric binder is a polyurethane.

3. The energy absorbing member of claim 1 in which said second hollow ceramic microspheres have typical diameters of less than about 1/5 of the typical diameters of said first hollow ceramic microspheres.

4. The energy absorbing member of claim 1 in which said first hollow ceramic microspheres have a sufficient diameter to absorb energy by being crushed.

5. The energy absorbing member of claim 1 in which said first hollow ceramic microspheres comprise at least about 50% by weight of the syntactic foam energy absorbing member.

6. The energy absorbing members of claim 1 in which said second hollow ceramic microspheres comprise a weight of less than about 1/5 of the weight of said first hollow ceramic microspheres.

7. The energy absorbing member of claim 1 in which said elastomeric binder comprises about 1.3 by weight of the syntactic foam energy absorbing member.

8. The energy absorbing member of claim 1 in which said first hollow ceramic microspheres comprise at least about 50% by weight; said second hollow ceramic microspheres between about 8% and about 12% by weight; and said elastomeric binder comprises about 27% to about 33% by weight of the syntactic foam energy absorbing member.

9. The syntactic foam energy absorber of claim 1 in which said first hollow ceramic microspheres have typical diameters of between about 0.06 millimeters and about 2.8 millimeters.

10. The syntactic foam energy absorber of claim 1 in which said second hollow ceramic microspheres have typical diameters of between about 0.02 millimeters and about 0.13 millimeters.

11. The syntactic foam energy absorber of claim 1 in which said elastomeric binder comprises between about 12% and about 17% by volume of the syntactic foam energy absorber.

12. The syntactic foam energy absorber of claim 1 in which the said elastomeric binder is sufficient to maintain said microspheres in substantial abutting relationship to one another whereby said elastomerica binder has very little room to move.

13. A syntactic foam energy absorbing member bumper for motor vehicles comprising:
    first hollow ceramic microspheres being generally uniformly distributed;
    second hollow ceramic microspheres having typical diameters of less than the typical diameters of said first microspheres, said second microspheres being intermixed to fill in the interstices between said first microspheres; and
    an elastomeric binder distributed throughout the intermix of said first and said second microspheres to fill in residual interstices between said microspheres and binding said microspheres in substantial abutting relationship with each other whereby said elastomeric binder has substantially no room to move.

14. The syntactic foam energy absorbing bumper of claim 13 in which said first hollow ceramic microspheres comprise a major percentage volume of the syntactic foam.

15. The syntactic foam energy absorbing bumper of claim 13 in which said first hollow ceramic microspheres are of sufficient size to absorb energy by being crushed.

* * * * *